United States Patent
Pepka

(10) Patent No.: US 9,944,144 B2
(45) Date of Patent: Apr. 17, 2018

(54) SPRING AND DAMPER SYSTEMS FOR ATTENUATING THE TRANSMISSION OF ENERGY

(71) Applicant: Renton Coil Spring Company, Renton, WA (US)

(72) Inventor: Charles F. Pepka, Renton, WA (US)

(73) Assignee: Renton Coil Spring Company, Renton, WA (US)

( * ) Notice: Subject to any disclaimer, the term of this patent is extended or adjusted under 35 U.S.C. 154(b) by 0 days.

(21) Appl. No.: 14/666,066

(22) Filed: Mar. 23, 2015

(65) Prior Publication Data

US 2015/0198217 A1    Jul. 16, 2015

Related U.S. Application Data

(63) Continuation-in-part of application No. 13/829,830, filed on Mar. 14, 2013, now Pat. No. 9,360,073, and
(Continued)

(51) Int. Cl.
*F16F 1/04* (2006.01)
*B60G 15/04* (2006.01)
(Continued)

(52) U.S. Cl.
CPC .............. *B60G 15/04* (2013.01); *B60G 11/54* (2013.01); *F16F 1/125* (2013.01); *F16F 3/04* (2013.01);
(Continued)

(58) Field of Classification Search
CPC .... F16F 1/123; F16F 1/125; F16F 3/04; F16F 2236/06; F16F 7/14; B60G 15/04; B60G 11/54; B60G 2202/312
See application file for complete search history.

(56) References Cited

U.S. PATENT DOCUMENTS

| 571,972 A | * | 11/1896 | Janney | F16F 3/04 267/168 |
|---|---|---|---|---|
| 756,175 A | | 3/1904 | Meisselbach | |

(Continued)

FOREIGN PATENT DOCUMENTS

| DE | 1713815 U | 12/1955 |
|---|---|---|
| DE | 1127671 B | 4/1962 |

(Continued)

OTHER PUBLICATIONS

PCT International Search Report and Written Opinion of International Application No. PCT/US2011/025479 dated Aug. 10, 2012, 73 Pages.

(Continued)

*Primary Examiner* — Melody M Burch
(74) *Attorney, Agent, or Firm* — Lowe Graham Jones PLLC

(57) ABSTRACT

A vibration attenuation system for attenuating a transmission of an input signal is disclosed. The system includes a helical spring, a first terminal, and a first damping element. The helical spring includes a plurality of helical coils, a first end, and a second end. The plurality of helical coils define an inner volume of the helical spring intermediate the first and second ends. The first terminal includes a first inner member. The first terminal is coupled to the first end of the helical spring. The first inner member extends into the inner volume of the helical spring. The first damping element is positioned on the first inner member. The first damping element is within the inner volume of the helical spring. When the input signal is provided to the helical spring, the first damping element engages the helical coils and attenuates the transmission the input signal.

23 Claims, 11 Drawing Sheets

Related U.S. Application Data a continuation-in-part of application No. 12/710,899, filed on Feb. 23, 2010, now Pat. No. 9,689,451.

(51) Int. Cl.

| | | |
|---|---|---|
| *F16F 1/12* | (2006.01) | |
| *F16F 3/04* | (2006.01) | |
| *B60G 11/54* | (2006.01) | |
| *B60G 11/14* | (2006.01) | |

(52) U.S. Cl.
CPC .... *B60G 2202/312* (2013.01); *F16F 2236/06* (2013.01)

(56) References Cited

U.S. PATENT DOCUMENTS

| | | | |
|---|---|---|---|
| 1,486,295 A * | 3/1924 | Mullen | B60G 11/16 267/237 |
| 2,044,649 A | 6/1936 | Swennes | |
| 2,248,447 A | 1/1939 | Wood | |
| 2,934,336 A | 8/1957 | Kimsey | |
| 3,030,056 A | 9/1959 | Rogers | |
| 3,039,758 A * | 6/1962 | Gratzmuller | B60T 8/30 123/179.31 |
| 3,178,036 A | 4/1965 | Cardwell | |
| 3,446,907 A * | 5/1969 | Bouche | G01M 7/00 174/42 |
| 3,779,537 A | 12/1973 | Kalister | |
| 4,055,935 A * | 11/1977 | Malion | A01D 34/6812 188/77 W |
| 4,077,619 A * | 3/1978 | Borlinghaus | F16F 1/08 267/166 |
| 4,172,778 A | 10/1979 | van de Leest et al. | |
| 4,174,009 A * | 11/1979 | Laing | F01K 3/00 165/104.31 |
| 4,174,099 A | 11/1979 | Yamasaki | |
| 4,197,931 A | 4/1980 | Norcia | |
| 4,254,855 A | 3/1981 | Hildebrand | |
| 4,509,473 A | 4/1985 | Hamparian | |
| 4,538,563 A | 9/1985 | Mayers | |
| 4,645,054 A | 2/1987 | Raab | |
| 4,653,736 A | 3/1987 | Pontoppidan | |
| 4,731,902 A | 3/1988 | Johnston | |
| 4,732,372 A | 3/1988 | Dickhart | |
| 4,817,927 A | 4/1989 | Martin | |
| 4,869,473 A * | 9/1989 | Giovanni | B60T 8/1837 267/169 |
| 5,201,199 A * | 4/1993 | Kemper | D04B 27/26 139/82 |
| 6,079,698 A | 6/2000 | Patterson | |
| 7,252,593 B2 | 8/2007 | Kroll | |
| 7,445,553 B2 | 11/2008 | Nakagaito | |
| 7,568,682 B2 | 8/2009 | Seelmann | |
| 8,480,065 B2 | 7/2013 | Halcom | |
| 8,636,271 B2 | 1/2014 | Check | |
| 8,646,356 B2 | 2/2014 | Horie | |
| 2002/0113353 A1 * | 8/2002 | Erhardt | B60G 15/063 267/179 |
| 2005/0011714 A1 * | 1/2005 | Menzel | B23D 47/005 188/380 |
| 2005/0048263 A1 | 3/2005 | Ford | |
| 2005/0258582 A1 * | 11/2005 | Chou | F16F 1/125 267/177 |
| 2009/0071286 A1 | 3/2009 | Ueno | |
| 2011/0204550 A1 * | 8/2011 | Pepka | F16F 1/125 267/168 |

FOREIGN PATENT DOCUMENTS

| | | |
|---|---|---|
| DE | 1908903 U | 1/1965 |
| DE | 3631233 A1 | 3/1988 |
| DE | 8906198 U1 | 9/1990 |
| DE | 4320859 A1 | 1/1994 |
| DE | 102004031867 A1 | 8/2005 |
| DE | 102007011325 A1 | 9/2008 |
| DE | 102011108852 A1 | 1/2013 |
| EP | 1624219 A1 | 8/2006 |
| FR | 1255804 A | 3/1961 |
| FR | 1476682 A | 4/1967 |
| JP | 49134005 | 3/1948 |
| JP | 4413227 Y | 6/1969 |
| JP | 5420683 B1 | 7/1979 |
| JP | 06109052 A | 4/1994 |
| JP | 06033967 A | 8/1994 |
| JP | 2009074605 A | 4/2009 |
| WO | 2007118058 A2 | 10/2007 |
| WO | 2011094163 A1 | 8/2011 |

OTHER PUBLICATIONS

PCT International Search Report and Written Opinion of International Application No. PCT/US2014/0227912 dated Jul. 18, 2014, 117 Pages.

PCT International Search Report and Written Opinion of International Application No. PCT/US2015/023831 dated Jun. 21, 2016; 100 Pages.

Foreign Office Action dated Aug. 5, 2016; 6 Pages.

Office Action; dated Sep. 6, 2017; pp. 44.

* cited by examiner

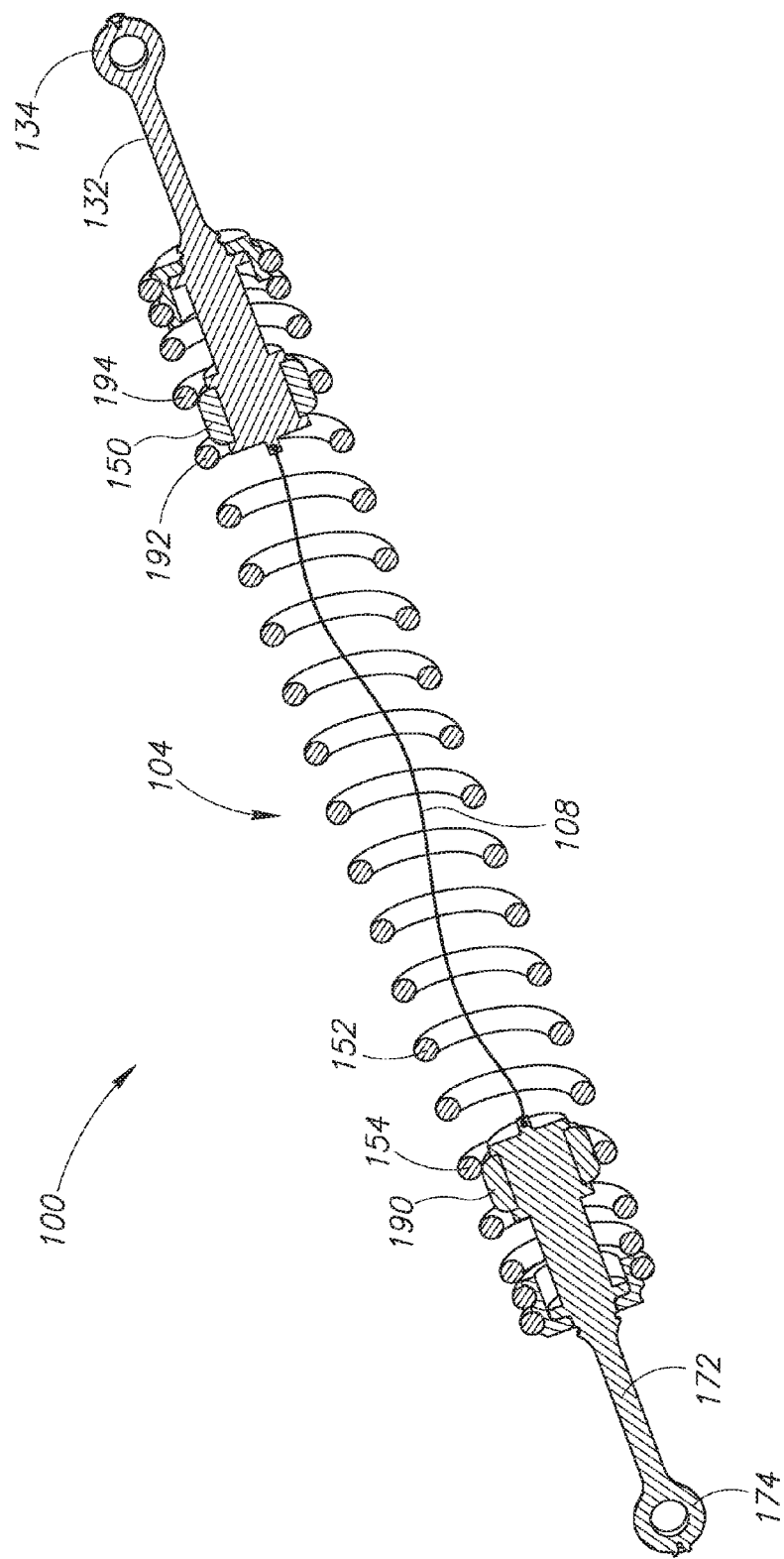

SPRING AND DAMPER SYSTEMS FOR ATTENUATING THE TRANSMISSION OF ENERGY

PRIORITY CLAIM

This patent application is a Continuation-in-Part of U.S. application Ser. No. 12/710,899 entitled TENSION SPRING MOUNT, filed on Feb. 23, 2010, the contents of which are hereby incorporated by reference. Furthermore, this patent application is a Continuation-in-Part of U.S. Pat. No. 9,360,073 entitled TENSION SPRING MOUNT WITH FRICTION-RESISTANT COATING, filed on Mar. 14, 2013, the contents of which are hereby incorporated by reference.

FIELD OF THE INVENTION

The field of the invention relates generally to attenuating the vibration of components or systems. The invention relates more particularly to systems for attenuating and damping the transmission of an input signal and/or input energy.

BACKGROUND OF THE INVENTION

Springs provide a restoring force when mechanical work elastically deforms the shape of the spring. The restoring force is directed along a direction that would tend to restore the spring to its relaxed or non-deformed shape or state. Accordingly, springs are often employed in applications that require biasing or restoring the position of an element or structure to a position that corresponds to the spring's relaxed state.

The restoring force is a result of the spring's elastic properties. Namely, when elastically deformed, the spring stores at least a portion of the energy associated with the deforming mechanical work. This mechanical potential provides the restoring force. Springs release the stored potential energy in the form of mechanical work via the restoring force, often resulting in oscillatory motion. Some springs store energy by an elastic elongation/stretching and/or shortening/compression along a longitudinal axis of the spring, such as the case with helical or coil springs.

Within a range of displacement or deformation away from the relaxed state, the magnitude of the restoring force of many springs is approximately linearly proportional with the displacement. Furthermore, the restoring force is directed in the opposite direction of the displacement. Within the linear range of displacement, the restoring force may be modeled by employing Hooke's law. At least to first order, the kinematics of such springs are adequately approximated as harmonic or sinusoidal motion.

When coupled to other structures or elements, harmonic oscillators, such as springs, transmit at least a portion of the vibrational or oscillatory energy to the other structures. Harmonic oscillators and systems comprised of harmonic oscillators resonate at defined resonant frequencies that depend upon properties of the oscillators and the systems. Thus, when a spring is driven at or near a resonant frequency, the transmitted energy may be amplified, causing damage and/or catastrophic failure of the oscillator or the other structures that are receiving the transmitted vibrational energy.

For an oscillating system driven by an energy-carrying signal, the transmissibility of the system is defined as the ratio of the input energy to the transmitted output energy. Because the frequency of the input signal may vary, the transmissibility is often a function of the signal's frequency. Energy-dissipating elements, such as dampers, are often coupled to oscillators to dissipate vibrational energy and decrease the transmissibility of the system. When a damper is coupled to a spring, at least a portion of the energy stored in the spring is transmitted to the damper and dissipated over a time scale much longer than the period of the frequency of the system. Accordingly, the oscillatory motion is at least partially attenuated and/or damped.

However, design requirements of systems and assemblies often constrain the physical placement and types of damping elements that may be employed in various applications. Furthermore, coupling the damping or damper element to the spring may present further engineering challenges. When systems that include a plurality of oscillators require damping, the complexity of the engineering challenges is multiplied. It is for these and other considerations that the following disclosure is provided.

SUMMARY OF THE INVENTION

A vibration attenuation system for attenuating a transmission of an input signal is disclosed. The system includes a helical spring, a first terminal, and a first damping element. The helical spring includes a plurality of helical coils, a first end, and a second end. The plurality of helical coils define an inner volume of the helical spring intermediate the first and second ends. The first terminal includes a first inner member. The first terminal is coupled to the first end of the helical spring. The first inner member extends into the inner volume of the helical spring. The first damping element is positioned on the first inner member. The first damping element is within the inner volume of the helical spring. When the input signal is provided to the helical spring, the first damping element engages at least one of the plurality of helical coils and attenuates the transmission of at least a portion of the input signal.

In preferred embodiments, the damping element is a toroidal damping element. The toroidal damping element is topologically equivalent to a torus. The toroidal damping element is positioned on the first inner member. A receiving aperture or hole in the toroidal damping element receives the first inner member. The inner member includes a recessed portion. The first damping element is positioned on the recessed portion of the first inner member. The first member includes a shaft. At least a portion of the shaft is a hollow shaft.

The first terminal includes a helical groove. The helical groove engages with at least a helical coil adjacent to the first end of the helical spring to couple the first terminal to the spring. The first terminal includes a portion that is external to the inner volume of the helical spring. The external portion may include a mounting aperture. In at least one embodiment, when the helical spring is in a first state, such that the helical spring is storing a first amount of energy, the first damping element does not engage with the plurality of helical coils. When the helical spring is in a second state, such that the helical spring is storing a second amount of energy and the second amount of energy is greater than the first amount of energy the, the first damping element engages with the plurality of helical coils.

In some embodiments, the engagement between the first damping element and the at least one of the plurality of helical coils includes at least a frictional engagement between the first damping element and the at least one of the plurality of coils. The engagement between the first damping element and the at least one of the plurality of helical coils includes a compressive force on the first damping element.

The plurality of coils includes a first helical coil and a second helical coil. A distance between the first coil and the first end is greater than a distance between the second coil and the first end. When the input signal is provided to the helical spring, a magnitude of a first engagement force that is between the first damping element and the first coil is less than a magnitude of a second engagement force that is between the first damping element and the second coil. The first coil includes a first radius, the second coil includes a second radius, and the first radius is greater than the second radius. When the input signal is provided to the helical spring, the first damping element does not engage with the first coil such that the magnitude of the first engagement force is substantially zero.

In various embodiments, the system further includes a second terminal and a second damping element. The second terminal includes a second inner member. The second terminal is coupled to the second end of the helical spring. The second inner member extends into the inner volume of the helical spring. The second damping element is positioned on the second inner member. The second damping element is within the inner volume of the helical spring. When the input signal is provided to the helical spring, the second damping element engages another of the plurality of helical coils and further attenuates the transmission of at least a portion of the input signal. The system may further include a safety leash. A first end of the safety leash is coupled to the first inner member. A second end of the safety leash is coupled to the second inner member.

An energy-dissipating assembly for dissipating an input energy is disclosed herein. The assembly includes an energy-storage device and first energy-dissipating device. The energy-storage device stores at least a portion of energy corresponding to mechanical work provided to the energy-storage device. When energy is stored in the energy-storage device, an internal cavity of the energy-storage device is elastically deformed in response to the provided mechanical work. The first energy-dissipating device dissipates at least a portion of energy corresponding to mechanical work provided to a surface of the first energy-dissipating device. The first dissipating device is positioned within the internal cavity of the storage device. When an amount of input mechanical work that is greater than a work threshold is provided to the energy-storage device, the internal cavity of the energy-storage device is elastically deformed. The energy corresponding to the input mechanical work and stored in the energy-storage device performs mechanical work on the surface of the first energy-dissipating device. At least a portion of the stored energy is dissipated.

In various embodiments, the energy-storage device is a coil spring. The first energy-dissipating device may be an elastomer damping element. The first energy-dissipating device is positioned on a first inner terminal member. When the internal cavity of the energy-storage device is elastically deformed, the first inner terminal member translates along a longitudinal axis of the energy-storage device to provide engagement between the energy-storage device and the first energy-dissipating device. At least a portion of the stored energy is translated into mechanical work on the surface of the first energy-dissipating device.

In at least one embodiment, a frictional engagement between the energy-storage device and the first energy-dissipating device enables the stored energy to perform mechanical work on the surface of the first energy-dissipating device. The mechanical work that is performed on the surface of the first energy-dissipating device is provided by at least a force exerted on the surface of the first energy-dissipating device by the energy-storage device. The force may be a compression force. The force may be a friction force.

In a preferred embodiment, the assembly further includes a second energy-dissipating device. The second energy-dissipating device dissipates at least a portion of energy corresponding to mechanical work provided to a surface of the second energy-dissipating device. The second dissipating device is positioned within the internal cavity of the storage device. When an amount of input mechanical work that is greater than the work threshold is provided to the storage device, the internal cavity of the storage device is elastically deformed. Energy corresponding to the input mechanical work and stored in the energy-storage device performs mechanical work on the surface of the second energy-dissipating device. At least another portion of the stored energy is dissipated. The assembly may further include a leash coupled to the first energy-dissipating device. The leash is configured and arranged to constrain a motion of the first energy-dissipating device during a catastrophic release of energy by the energy-storage device. The first energy-dissipating device is an annular dissipating device.

A spring and damper system for damping vibrational energy is disclosed herein. The system includes a first spring, a second spring, and a first damper element. The first spring includes at least a first helical coil and a first longitudinal axis within a first internal volume of the first spring. The second spring includes at least a second helical coil and a second longitudinal axis. The first longitudinal axis and the second longitudinal axis are substantially aligned. The second coil is disposed within the first internal volume of the first spring. The first damper element includes an outer surface, a receiving aperture, and an inner surface of the aperture. The aperture receives at least the second coil of the second spring. The second coil is adjacent to the inner surface. The first coil of the first spring is disposed adjacent to the outer surface. The first coil of the first spring is configured and arranged to engage with the outer surface of the first damper element along a first helical arc subtending an angle of at least 90°. The second coil of the second spring is configured and arranged to engage with the inner surface of the first damper element along a second helical arc subtending an angle of at least 90°.

In a preferred embodiment, the first spring includes a third helical coil. The second spring includes a fourth helical coil that is disposed within the first internal volume of the first spring. The system may further include a second damper element and a third damper element. The second damper element includes a second outer surface, a second receiving aperture, and a second inner surface of the second aperture. The second aperture receives at least the fourth coil of the second spring. The fourth coil is adjacent to the second inner surface. The third coil of the first spring is disposed adjacent to the second outer surface. The third coil of the first spring is configured and arranged to engage with the second outer surface of the second damper element along a third helical arc subtending an angle of at least 90°. The fourth coil of the second spring is configured and arranged to engage with the second inner surface of the second damper element along a fourth helical arc subtending an angle of at least 90°.

The system further includes a first terminal that couples a first end of the first spring to a second end of the second spring. The first terminal includes a first helical groove on an outer surface that engages with at least one helical coil of the first spring and a second helical groove on an inner surface that engages with at least one helical coil of the second spring. The first spring includes a first resonant frequency. The second spring includes a second resonant frequency. The first resonant frequency and the second resonant frequency are dissimilar resonant frequencies. The first spring includes a first spring constant. The second spring includes a second spring constant. The first spring constant and the second spring constant are dissimilar spring constants. At least one of a frictional engagement between the first spring and the first damper element or a frictional engagement between the second spring and the first damper element stabilizes a longitudinal positioning of the first damper element.

A suspension assembly for attenuating a transmission of resonant signals is disclosed herein. The assembly includes a first signal-transmitting device, a second signal-transmitting device, and a first signal-attenuating device. The second signal-transmitting device is arranged in parallel with the first signal-transmitting device. The first signal-attenuating device is coupled to both the first signal-transmitting device and the second signal-transmitting device. The first signal-attenuating device is configured and arranged to substantially attenuate both a first signal provided to the first signal-transmitting device and a second signal provided to the second signal-transmitting device.

At least one of the first signal-transmitting device or the second signal-transmitting device is a spring device. The first-signal transmitting device and the second signal-transmitting device are arranged in a coaxial configuration. The first-signal transmitting device, the first signal-attenuating device, and the second signal-transmitting device are arranged in a coaxial configuration. The first signal provided to first signal-transmitting device is a resonant frequency of the first signal-transmitting device. The second signal provided to second signal-transmitting device is a resonant frequency of the second signal-transmitting device. A first impedance of the first signal-transmitting device is dissimilar to a second impedance of the second signal-transmitting device. The first signal-transmitting device is frictionally engaged with an outer surface of the first signal-attenuating device. The second signal-transmitting device is frictionally engaged with an inner surface of the first signal-attenuating device.

BRIEF DESCRIPTION OF THE DRAWINGS

Preferred and alternative examples of the present invention are described in detail below with reference to the following drawings:

FIG. 2B is a cross-sectioned view of the vibration attenuation system of FIG. 1B in a tensioned state.

DETAILED DESCRIPTION OF THE PREFERRED EMBODIMENTS

Figure 1A:
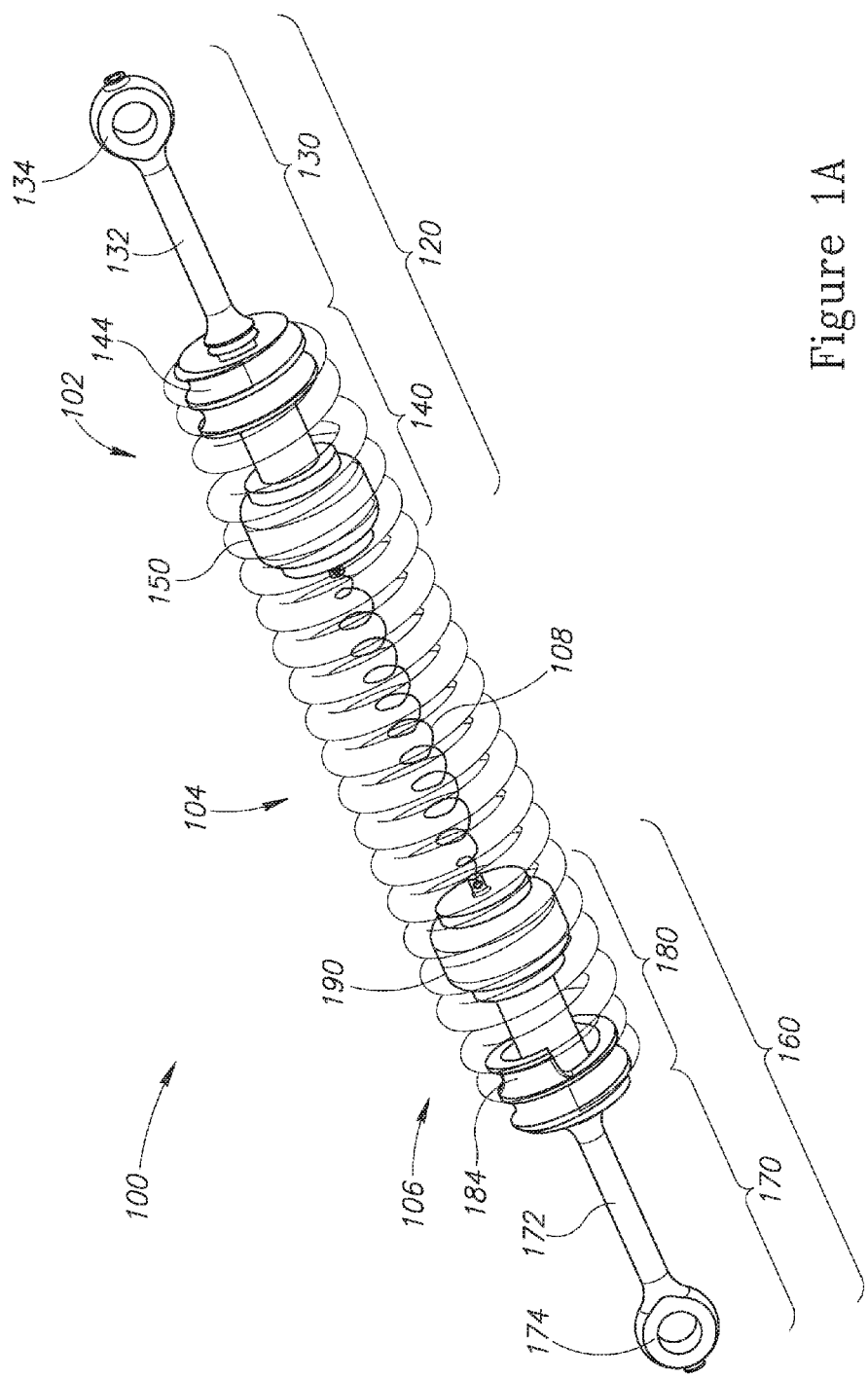
FIG. 1A illustrates an embodiment of a vibration attenuation system that includes an energy-storing element, two energy-dissipating elements, and a pair of terminal assemblies. The system is in a relaxed state.

This disclosure presents systems and methods for coupling structures, while decreasing the energy associated with a signal that is provided to the system and/or transmitted between the structures. To couple the structures, one or more couplers are employed. At least one of the couplers provides a restoring force. In preferred embodiments, when mechanical work displaces or deforms the shape of at least one of the couplers, the deformed coupler provides the restoring force. The restoring forces bias a relative positioning between the structures. Unless the system or the system's environment provides another force, the structures are positioned in the biased relative positioning. At least one of the couplers may be an energy-storing device or element. In embodiments that include a plurality of couplers, the system may include couplers that are arranged in parallel, series, and/or a combination thereof. Examples of couplers include, but are not limited to springs, such as helical or coil springs.

In addition to decreasing the transmission of energy-carrying signals between the structures, when an external element inputs energy into the various systems presented herein, the systems and methods attenuate and/or dissipate at least a portion of the energy input. For instance, energy-dissipating elements may be coupled to at least one of the couplers. Through an energy-transferring engagement between the coupler and the energy-dissipating element, the coupler transmits at least a portion of the inputted energy to the energy-dissipating element. The energy-dissipating element safely dissipates at least a portion of the inputted energy away from the system and over an acceptable time interval. Furthermore, the energy-dissipating element decreases the transmission of energy between the coupled structures. Examples of energy-dissipating elements include, but are not limited to damper and/or damping elements or devices.

One non-limiting application of the various embodiments of systems and methods presented herein include vehicles such as aircraft, spacecraft, and overland vehicle assemblies and sub-assemblies. Although much of the following discussion is in regards to air and spacecraft, it should be understood that the principles and various embodiments disclosed herein may be readily adapted and applied to any vehicle or other assembly and/or system that is acted upon by external forces or energy-carrying signals.

Modern aircraft designs require the coupling of many structures, while simultaneously decreasing the transmission of energy between the structures. Additionally, under normal flight conditions, the acceleration/deceleration of the aircraft, as well as the aircraft's velocity through the atmosphere results in a substantial energy transfer or impulse to the various structures included in the aircraft. For example, high velocity translations relative to a turbulent atmosphere may induce oscillatory motion in aircraft components at resonant frequencies. This induced acceleration of the aircraft components may cause the components or couplers linking the components to catastrophically fail or otherwise become damaged. Furthermore, the aircraft design may require a biasing of the relative positioning between some of the coupled structures.

A non-limiting example pertains to aircraft landing gear. Landing gear must be coupled to the fuselage or other structural elements of an aircraft or a spacecraft. Furthermore, to avoid an unacceptable scenario where the landing gear are stuck in an "up" or retracted position, a restoring force may be required to bias the landing gear in a "down," "landing," or otherwise protracted position. After takeoff, a secondary force, provided by hydraulics, pneumatics, or another mechanism, may overcome the restoring force to position the landing gear in the retracted position. When the secondary force is not present, the restoring force biases or restores the landing gear in the protracted position and decreases the likelihood that the landing gear sticks in the retracted position. A spring may be employed to at least partially couple the landing gear to the craft and provide the restoring force to bias the landing gear in the protracted position.

In various embodiments, one or more springs are coupled between the craft and the landing gear. The spring is under tension when the landing gear is in the retracted position. When retracted, the tensioned spring provides a restoring force. When the landing gear is protracted, the spring is relaxed relative to the retracted state. Accordingly, during a substantial portion of a flight, the spring in under tension. At least one damper is coupled to the spring to decrease the transmission of energy between the landing gear and the craft. The damper also dissipates energy supplied to the plane during its translation through a relatively dense atmosphere and the forces associated with the acceleration/declaration of the aircraft during takeoff, flight, and landing. The damper also dampens the transmission of such forces to the landing gear via the tensioned spring. In preferred embodiments, at least one of the dampers is configured to dissipate energy over a range of frequencies that include at least one resonant frequency of the plane's various systems or assemblies. Without such a system, the various couplers and other craft components may become damaged or otherwise catastrophically fail due to the inability to dissipate, attenuate, or otherwise damp forces and/or energy-carrying signals that are inputted to the aircraft during normal operation.

As noted above, the various systems and methods employ one or more energy-dissipating elements, such as dampers, in conjunction with one or more energy-storing couplers, such as helical or coil springs. The damper elements are positioned to contact the sides of a coil spring during motion of the spring. In various embodiments, at least one of the damper elements is "inline" and inside the coil spring. The choice of elastic properties of the material and physical dimensions of the energy-dissipating elements, as well as the total number of energy-dissipating damper elements employed in the configuration or system, tailors the damping amplitude and rebound of the system.

FIG. 1A illustrates an embodiment of a vibration attenuation system 100 that includes an energy-storing element 104, two energy-dissipating elements 150/190, and a pair of terminal assemblies 120/160. In various embodiments, system 100 is a spring and damper system. The system 100 may include an energy-dissipating assembly. In FIG. 1A, system 100 is shown in a relaxed state. When in a relaxed state, energy-storing element 104 is storing a decreased amount of energy relative to when energy-storing element 104 is under tension or compression. Note in FIG. 1A, the energy-storing element 104 is shown as transparent for better understanding and description of the various parts of the configuration.

Energy-storing element 104 may be a spring, such as a helical or a coil spring. As shown in FIG. 1A, in some embodiments, spring 104 is a tension spring. In other embodiments, spring 104 is a compression spring. In a preferred embodiment, when relaxed, spring 104 is neither under tension nor under compression. Helical spring 104 includes a plurality of coils terminating at a first spring end 102 and a second spring end 106. In preferred embodiments, the coils are helical coils. The coils of spring 104 define an inner spring volume that is between the first spring end 102 and the second spring end 106 and inside of the coils. Spring 104 includes a longitudinal axis that is coaxial with the longitudinal axis of the spring's inner volume.

A first terminal assembly 120 is coupled to the first spring end 102. First terminal assembly 120 includes a first terminal inner sub-assembly 140 and a first terminal outer sub-assembly 130. As show in FIG. 1A, at least a portion of first terminal inner sub-assembly 140 is positioned within the inner spring volume of spring 104. Likewise, at least a portion of first terminal outer sub-assembly 130 is positioned outside of the inner spring volume. First terminal inner sub-assembly 140 and first terminal outer sub-assembly 130 are coupled together to form the first terminal assembly 120.

Figure 1B:
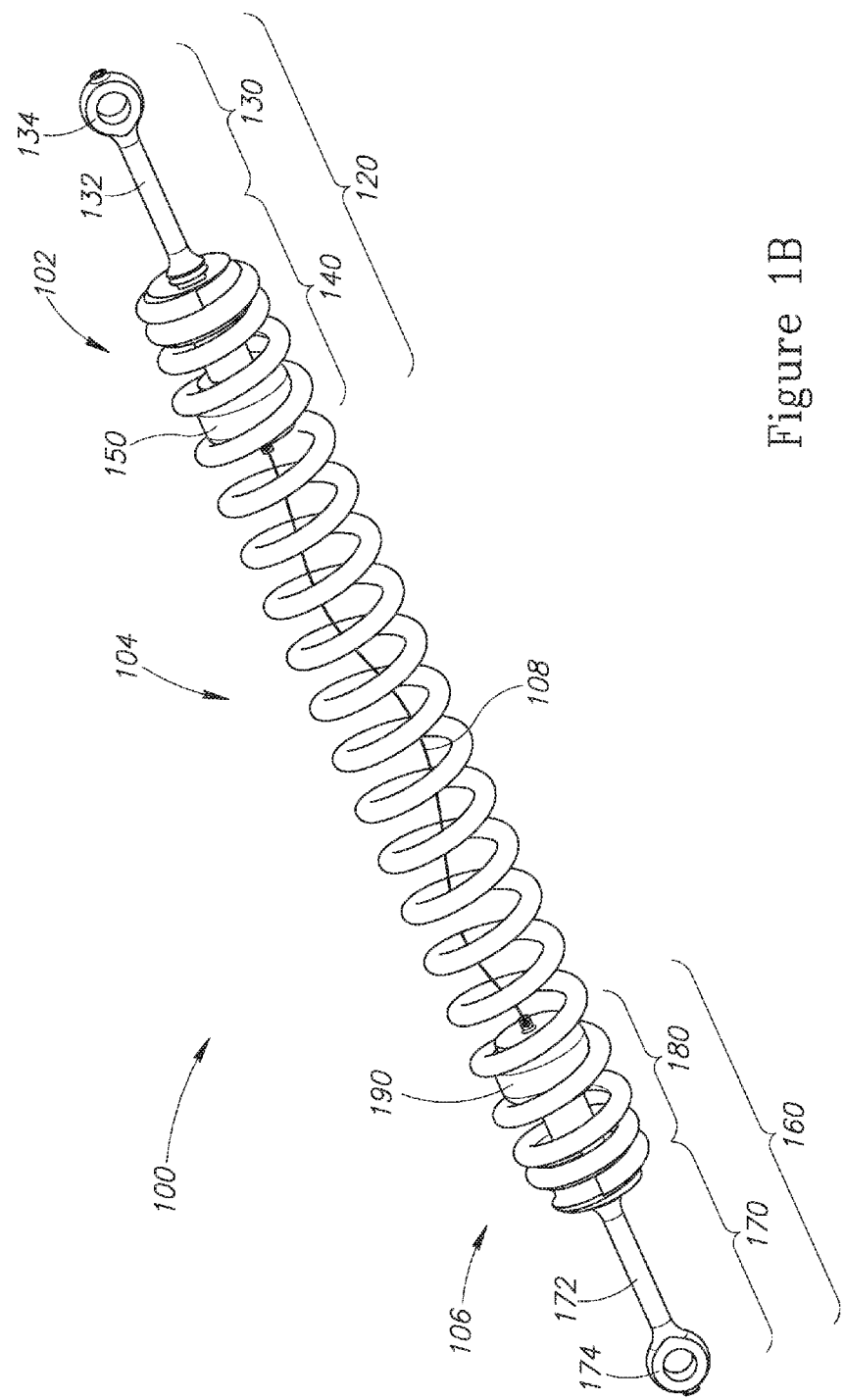
FIG. 1B illustrates the vibration attenuation system of FIG. 1A in a tensioned state.
Figure 1C:
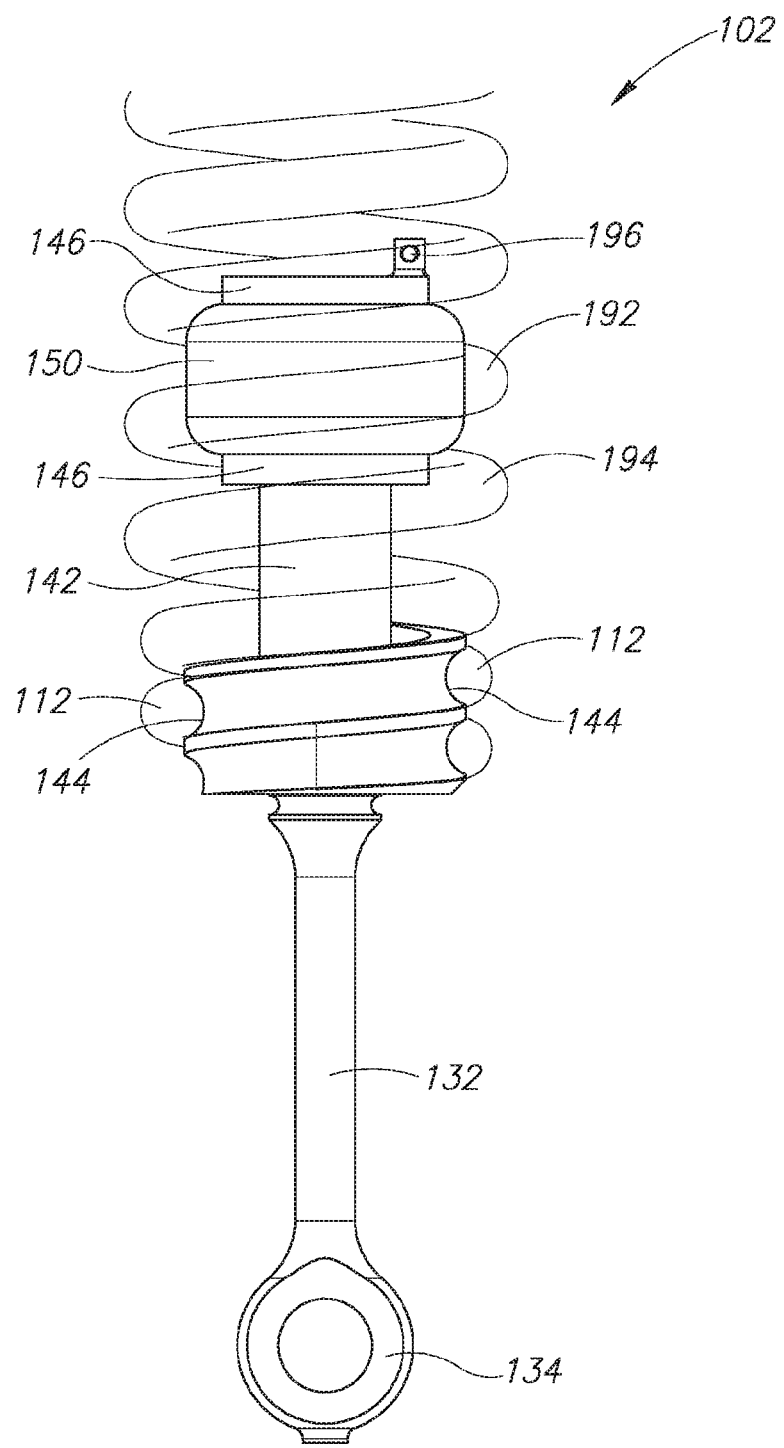
FIG. 1C is a close-up view of one of the spring ends and terminals of the vibration attenuation system of FIG. 1A.

A close-up view of first terminal inner sub-assembly 140 is provided in FIG. 1C. The first energy-dissipating element 150 is coupled to an inner shaft included in first terminal inner sub-assembly 140, such as first terminal inner shaft 142 shown in FIG. 1C. As such, the first energy-dissipating element 150 is positioned within the inner spring volume of spring 104. The first terminal inner shaft 142 is coaxial with spring's 104 longitudinal axis. The first terminal inner sub-assembly 140 also includes a first set of helical grooves 144. The first set of helical grooves 144 receives at least one of the coils of the first spring end 102 and couples the first terminal assembly 120 to spring 104. In a preferred embodiment, the first terminal assembly 120 is coupled to spring 104 by helical grooves 144 rotatably receiving the most distal coils of the first spring end 102. Such a coupling mechanism is similar to when the threads of a nut receive the corresponding threads of a screw and couple the bolt to the screw.

The first terminal outer assembly 130 includes a first terminal outer shaft 132 and a first terminal mounting aperture 134 or eyelet. At least a portion of the first terminal outer shaft 132 and the first terminal mounting aperture 134 are positioned outside of the inner volume of spring 104. The mounting aperture enables coupling the system 100 to another system, structure, assembly, or the like. The first terminal outer shaft 132 is coaxial with the first terminal inner shaft 142 and the spring's 104 longitudinal axis As shown in FIG. 1A, the second spring end 106 is similarly coupled to the second terminal assembly 160 through the second set of helical grooves 184. The second terminal assembly is of similar construction to the first terminal assembly 120. As such, second terminal assembly 160 includes second terminal inner sub-assembly 180 and second terminal outer sub-assembly 170. The second energy-dissipating element 190 is positioned on a second terminal inner shaft 182, as shown in the cutaway view of FIG. 2A. Second terminal outer sub-assembly 170 includes a second terminal outer shaft 172 and a second terminal mounting aperture 174.

System 100 includes safety leash 108 that couples first terminal inner sub-assembly 140 to second terminal sub-assembly 180 through the inner volume of spring 104. In the event that spring 104 catastrophically breaks and/or releases a substantially amount of energy to at least one of the terminal inner sub-assemblies 140/180, the two internal sub-assemblies 140/180 are coupled together to prevent the terminal assemblies 120/160, spring portions, or other parts from falling away or becoming projectiles. Safety leash 108 may be a coiled leash so that when spring 104 is stretched under tension, the uncoiling of coiled safety leash 108 compensates for the increased distance between the first and second terminal inner sub-assemblies 140/180. Safety leash 108 may be a braided cable, such as a steel braided cable. Safety leash 108 may include a sheath, such as a rubber sheath.

When spring 104 is undergoing oscillations, the amplitude of the linear momentum of first terminal assembly 120 is substantially equivalent to the amplitude of the linear momentum of second terminal assembly 160. The linear momentum of both first terminal assembly 120 and second terminal assembly 160 is directed along the longitudinal axis of spring 104, but the linear momenta are along opposing directions of the axis. Accordingly, when coupled by safety leash 108, the first terminal assembly 120 and the second terminal assembly 160 comprise a terminal assembly sub-system that includes a net linear momentum that is substantially equivalent to zero. Thus, in a catastrophic release of energy by spring 104, the energy transferred to the first/second terminal assemblies 120/160 does not result in a substantial projectile motion of the terminal assembly sub-system, thus increasing the safety of system 100.

Although FIG. 1A shows system 100 as including two terminal assemblies 120/140 and two energy-dissipating elements 150/190, other embodiments are not so constrained. For instance, in at least one embodiment, the system 100 may include only a single energy-dissipating element and/or a single terminal assembly. In other embodiments, additional energy-dissipating elements may be included in system 100, including positioning addition energy-dissipating elements within the inner volume of spring 104.

At least one of the energy-dissipating elements 150/190 may be a damper element and/or a damper device. One embodiment of an energy-dissipating element is shown as damper element 450 of FIGS. 4A-4C. An energy-dissipating element may be shaped to include at least one of a toroidal shape, an annular shape, a "donut" shape, a ring shape, an at least partially hollowed cylinder shape, or the like. An energy-dissipating element or device may be constructed from any material that damps oscillating motion. Such materials include, but are not limited to polymers or elastomers, such as a natural or synthetic rubber. Accordingly, energy-dissipating elements 150/190 may be a rubber "donut," torus, annulus, ring, or the like. In preferred embodiments, energy-dissipating elements 150/190 are constructed from an aerospace rubber.

FIG. 1B illustrates the vibration attenuation system 100 of FIG. 1A in a tensioned state. Spring 104 is stretched under tension and the distance between the first terminal assembly 120 and the second terminal assembly 160 has increased. Coiled safety leash 108 has likewise uncoiled to compensate for the stretch in spring 104.

As discussed in greater detail below, when in a stretched state, each of energy-dissipating elements 150/190 engage with at least one of the coils of spring 104. This engagement transfers energy stored within the coils of spring 104 to the energy-dissipating elements 150/190, and is thus an energy-transferring engagement. The energy-dissipating elements 150/190 dissipate at least a portion of this transferred energy away from system 100. Accordingly, system 100 dampens vibrational and/or oscillatory motion. Cutaway views of system 100 are provided in FIGS. 2A-2C to show the energy transferring engagement between the coils of spring 104 and the energy-dissipating elements 150/190.

Design parameters for system 100 include the outer diameter of the energy-dissipating elements 150/190 and the inner diameter of spring 104. Appropriate parameter choices ensure that, during at least a portion of the spring's 104 displacement, each energy-dissipating element 150/190 engages with a portion of the coils as the coils slightly compress the dissipating elements 150/190 during at least a portion of the spring's displacement. This frictional and/or compressive engagement absorbs (and damps) a portion of the coils' kinetic energy.

Coils positioned toward the spring ends 102/106 may be tapered to include a reduced diameter. When the spring is elongated or stretched as shown in FIG. 1B, the damper more forcefully engages with these tapered coils. Accordingly, tapering the distal coils achieves a progressive damping effect.

FIG. 1C is a close-up view of first spring end 102 and first terminal assembly 120 of the vibration attenuation system of FIG. 1A; the spring is shown transparent for illustrative purposes. The most distal coils 112 of first spring end 102 are received by the helical grooves 144 of first terminal inner sub-assembly 140 to couple the first spring end 102 to the first terminal inner shaft 142, first terminal outer shaft 132, and first terminal mounting aperture 134.

Figure 2A:
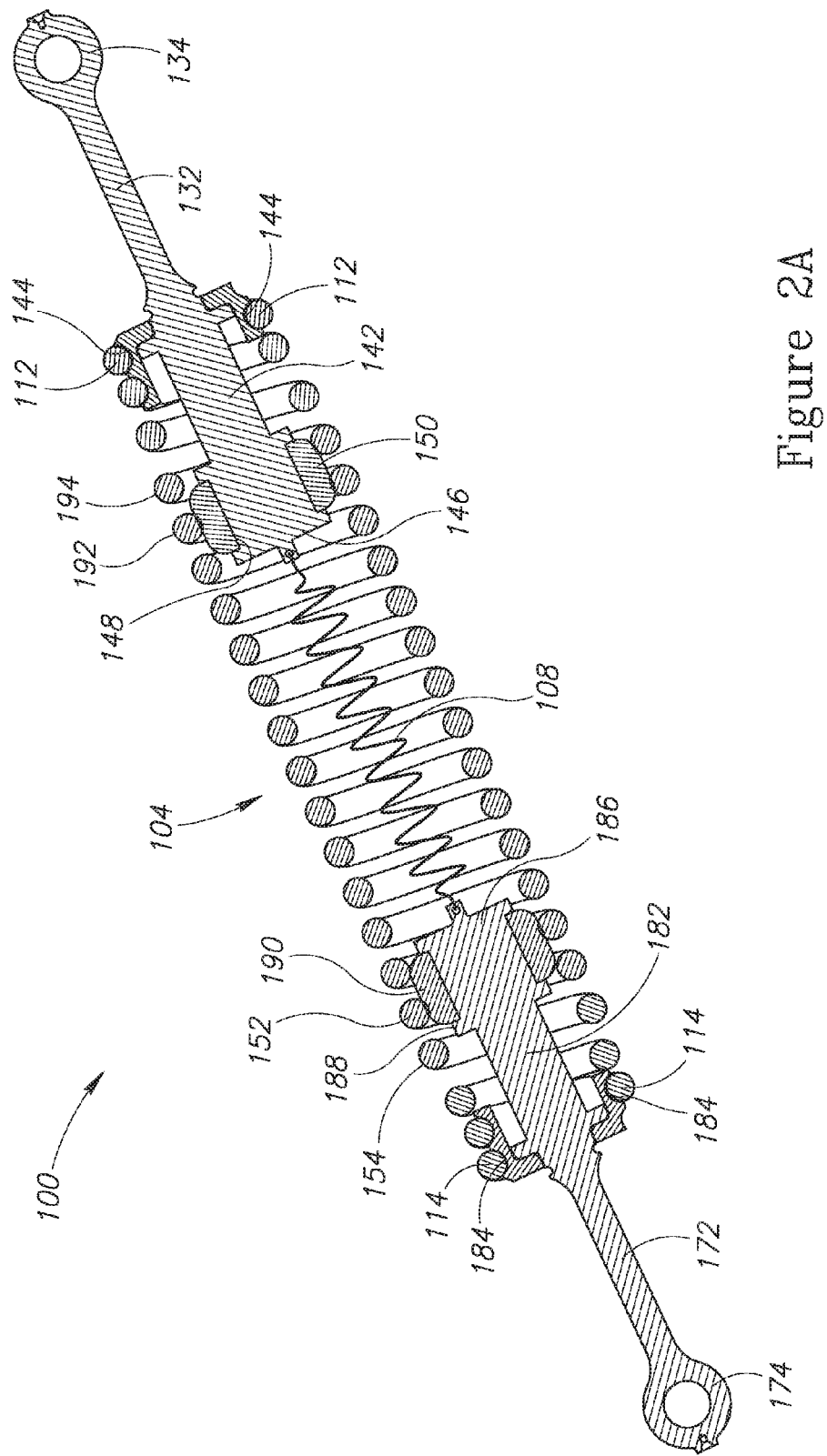
FIG. 2A is a cross-sectioned view of the vibration attenuation system of FIG. 1A in a relaxed state.

First terminal inner shaft 142 includes a first terminal receiving member 146 on the innermost end of first terminal inner shaft 142. In various embodiments, first energy-dissipating element 150 is positioned on and coupled to first terminal receiving member 146. Accordingly, the energy-dissipating elements 150/190 are "inline" with spring 104. In a preferred embodiment, the first terminal receiving member 146 includes a recessed or grooved portion 148 (as shown in FIG. 2A) that is configured to receive the first energy-dissipating element 150.

Figure 4A:
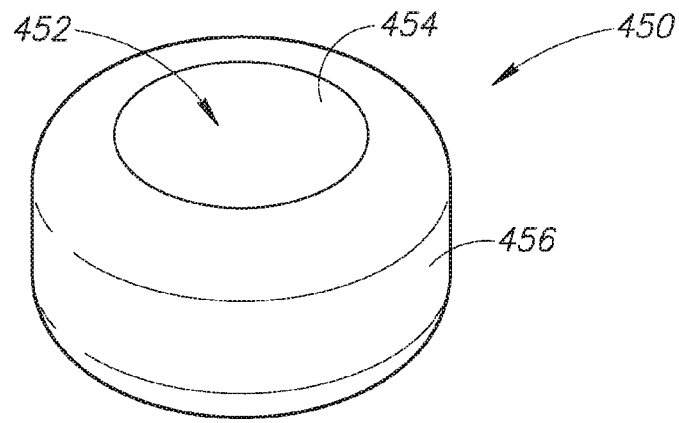
FIGS. 4A-4C show various views of one embodiment of an energy-dissipating element.
Figure 4B:
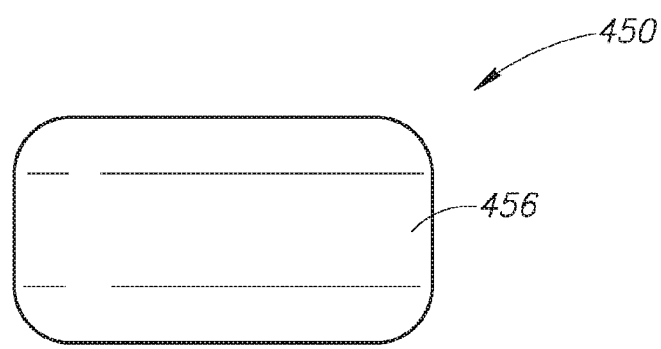
Figure 4C:
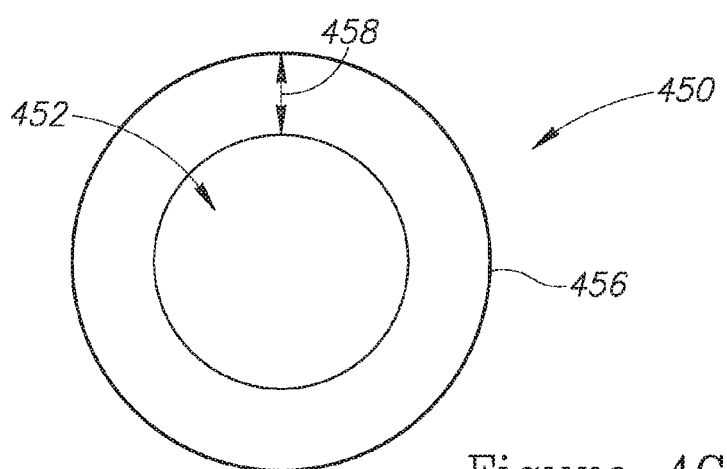

As noted above. FIGS. 4A-4C provide various views of an embodiment of an energy-dissipating element this is consistent with the various embodiments disclosed herein. FIG. 4A provides an isometric view of a toroidal, annular, or "donut" shaped energy-dissipating or damper element 450. Damper element 450 includes a damper or receiving aperture 452, an inner surface 454 of the damper aperture 452, and an outer surface 456. Damper or receiving aperture 452 may be a hole in damper element 450. FIG. 4B shows a side-view of damper element 450. FIG. 4C shows a top-view of damper element 450. As shown in FIGS. 4A-4C, damper element is topologically equivalent to a torus.

Damper element 450 is defined by a damper axis that is an axis of symmetry and centrally positioned in the damper aperture 452. Damper element 450 may include an outer radius, an inner radius, and a length (along the damper axis). The damper thickness 458 may be defined by the difference between the outer radius and the inner radius. The absolute and relative dimensions of the inner radius, outer radius, thickness, length, and the like of damper element 450 are not constrained by the invention. Rather, these dimensions are tailored to the specific application of a specific embodiment of the invention. Each of energy-dissipating elements 150/190 may include similar features to damper element 450.

As shown in FIGS. 4A-4B, the upper and lower (with respect to the longitudinal axis) portions of damper outer surface 456 may be tapered, curved, and/or graduated. The upper and/or lower tapering of damper element 450 may enable a progressive engagement with the coils of an energy-storing device, such as spring 104. The tapering results in an outer radius that varies over the tapered portion of damper element 450.

Referring back to FIG. 1C, at least a portion of first terminal inner shaft 142 is received through an aperture in energy-dissipating element 150. The aperture may be similar to damper aperture 452 of FIGS. 4A-4C. In at least one embodiment, first energy-dissipating element 150 and the first terminal receiving member 146 are coupled together by at least one of a press fit, interference fit, a friction fit, or the like. Preferably, energy-dissipating element 150 can elastically deform or stretch to fit between the side flanges into the recessed portion 148 of terminal receiving member 146. The press or friction fit may be between an inner surface of the energy-dissipating element 150, such as inner surface 454, and a surface of the recessed portion 148 of first terminal receiving member 146. The first terminal inner sub-assembly 140 may also include coupling tab or coupling aperture 196 to couple safety leash 108 to the first terminal inner sub-assembly 140. As mentioned above, the second terminal sub-assembly 160 may include similar components to first terminal sub-assembly 140.

When in a relaxed state, as shown in FIG. 1C, the outer surface of energy-dissipating element 150 is adjacent to an inner surface of coil 192. Coil 192 is closer to the middle of spring 104 than more distal coil 194. Depending on the choice of the outer radius of energy-dissipating element 150 and the inner radius of relaxed coil 192, energy-dissipating element 150 may be in engagement with adjacent coil 192. In other embodiments, a gap exists between energy-dissipating element 150 and relaxed coil 192, as shown in FIG. 2D. Because of the gap, a frictional engagement between energy-dissipating element 150 and coil 192 is not occurring when system 100 is in a relaxed state. In these embodiments, an energy-transferring engagement occurs only when spring 104 in stretched under tension beyond a work threshold, such as a tension threshold. Accordingly, the energy-dissipating elements 150/190 are not exposed to excessive frictional wear, which prolongs the lifetime of energy-dissipating elements 150/190. As shown in a cutaway view provided in FIG. 2B, when spring 104 is stretched under tension beyond the tension threshold, the energy-dissipating element 150 is in engagement with coil 194. As noted throughout, this energy-transferring engagement with coil 194 may be a compressive engagement and/or a frictional engagement.

When an energy-dissipating or damper element is in engagement with at least one of the coils of an energy-storing element, a portion of the energy stored in the coils of the energy-storing element is transferred to the damper element. A portion of this transferred energy is dissipated away from system 100 by the damper element. At least a portion of this energy transfer between the engaging coil and the damper element is due to when under tension, a coil stores energy by an elongation in the longitudinal direction of spring 104. Consequently, the inner diameter or radius of the engaging coil in decreased. A decreased inner radius results in the stretched coil compressing the outer surface of the damper element. This compression deforms the elastic outer surface of the damper element. The compression and deforming of the damper element transfers energy from the coil to the damper. Due to the damping properties of the damper element, some of the transferred energy is dissipated from the system.

During compression or elongation of spring 104, the relative positions between energy-dissipating elements 150/190 are translated relative to the coils of spring 104. Thus, in some embodiments, additional energy dissipation occurs due to frictional engagement and frictional energy loss between the outer surface of the energy-dissipating elements 150/190 and the inner surfaces of the coils when the energy-dissipating elements 150/190 translates along the longitudinal axis of spring 104.

FIG. 2A is a cross-sectioned view of the vibration attenuation system 100 of FIG. 1A in a relaxed state. System 100 includes several solid members including first/second terminal outer shafts 132/172, first/second terminal inner shafts 142/182, and first/second terminal receiving members 146/186. One or more solid members may be included to provide at least one of strength, mass, and/or rigidity to system 100. At the first terminal of system 100, helical grooves 144 receive distal coils 112. Likewise, at the second terminal of system 100, helical grooves 184 receive distal coils 114. Safety leash 108 is in a coiled state. First and second mounting apertures 134/174 enable the coupling of system 100 to other structures.

First terminal receiving member 146 includes first recessed portion 148 that enables the coupling between first energy-dissipating element 150 and the first terminal receiving portion 146. Likewise, second terminal receiving member 186 includes second recessed portion 188 to enable the coupling between second energy-dissipating element 190 and the second terminal receiving portion 186. The first and second recessed portions 148/188 may be sized in both recessed depth and recessed length to receive, as well as stabilize the position of the first/second energy-dissipating elements 150/190. The upper and lower lips on the recessed portions 148/188 may decrease the likelihood any shifting of the longitudinal position of energy-dissipating elements 150/190 along the terminal receiving portions 146/148.

As discussed above, when in a relaxed state, first energy-dissipating element 150 is adjacent to coil 192. Likewise, second energy-dissipating element 190 is adjacent to corresponding coil 152. In some embodiments, when spring 104 is relaxed, energy-dissipating or damper elements 150/190 may be an energy-transferring engagement with coils 192/152 respectively. This engagement may be a frictional and/or compressive engagement. In preferred embodiments, when in a relaxed state, a gap between damper elements 150/190 and corresponding adjacent coils 192/152 exists so that no engagement occurs unless the spring 104 is under a threshold of tension, preventing excessive wear on damper elements 150/190.

FIG. 2B is a cross-sectioned view of the vibration attenuation system 100 of FIG. 1B in a tensioned state. Spring 104 is elongated and coil 194 is in an energy-transferring engagement with first energy-dissipating element 150. Likewise, coil 154 is in an energy-transferring engagement with second energy-dissipating element 190. In at least some embodiments, other a plurality of coils may be in simultaneous engagement with at least one of energy-dissipating elements 150/190. These engagements result in damping the oscillatory motion of system 100. In some embodiments, the coils that interact with energy-dissipating elements 150/190, such as coils 194/154, include a reduced radius or are otherwise tapered. Tapered coils, as well as the tapered, curved, and/or graduated upper and lower (with respect to the longitudinal axis) portions of the energy-dissipating elements 150 provide a progressive damping effect. Furthermore, in some embodiments, spring 104 may be prone to failing or breaking near the tapered coils. In preferred embodiments, the energy-dissipating elements 150/190 are positioned to engage with the tapered coils to further reduce the likelihood of catastrophic failure or damage to spring 104.

Figure 2C:
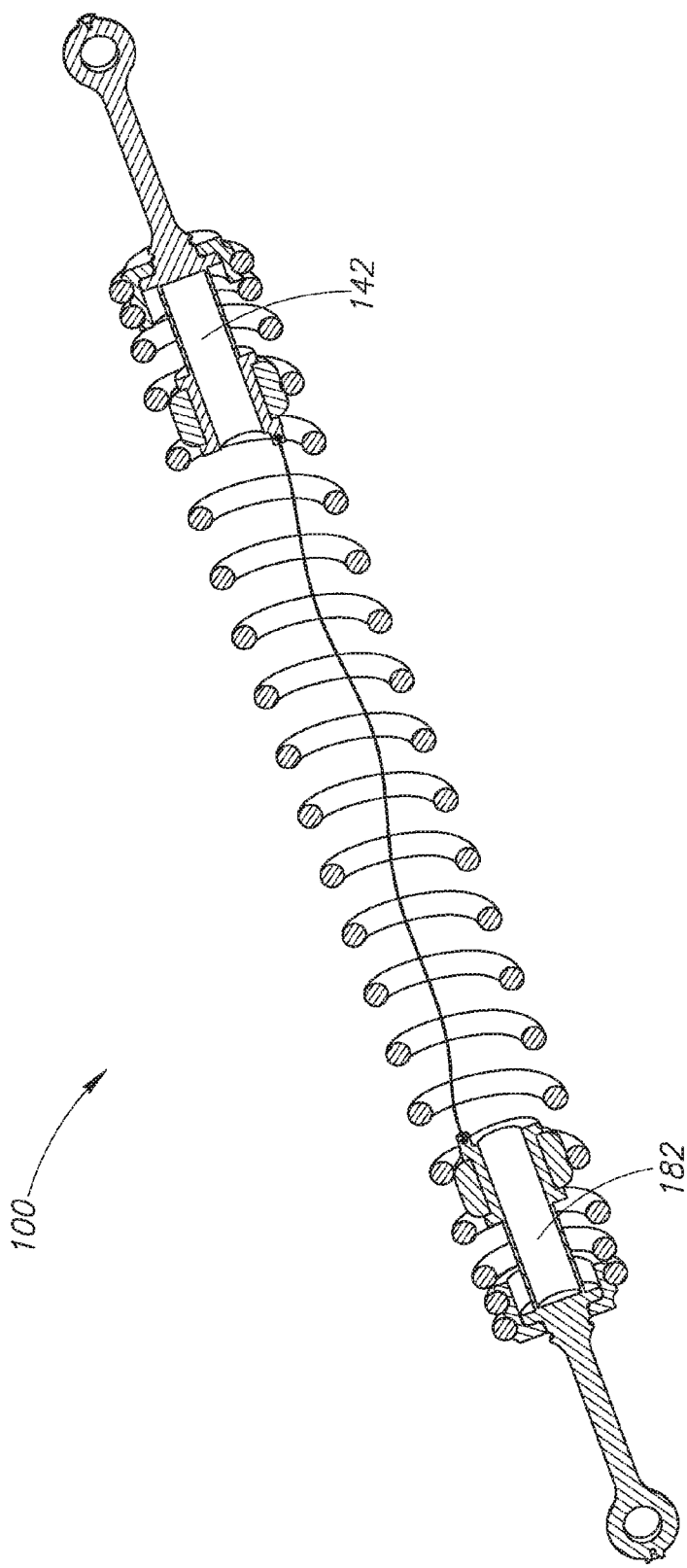
FIG. 2C illustrates another embodiment of a vibration attenuation system that includes hollow members. The system is in a tensioned state.
Figure 2D:
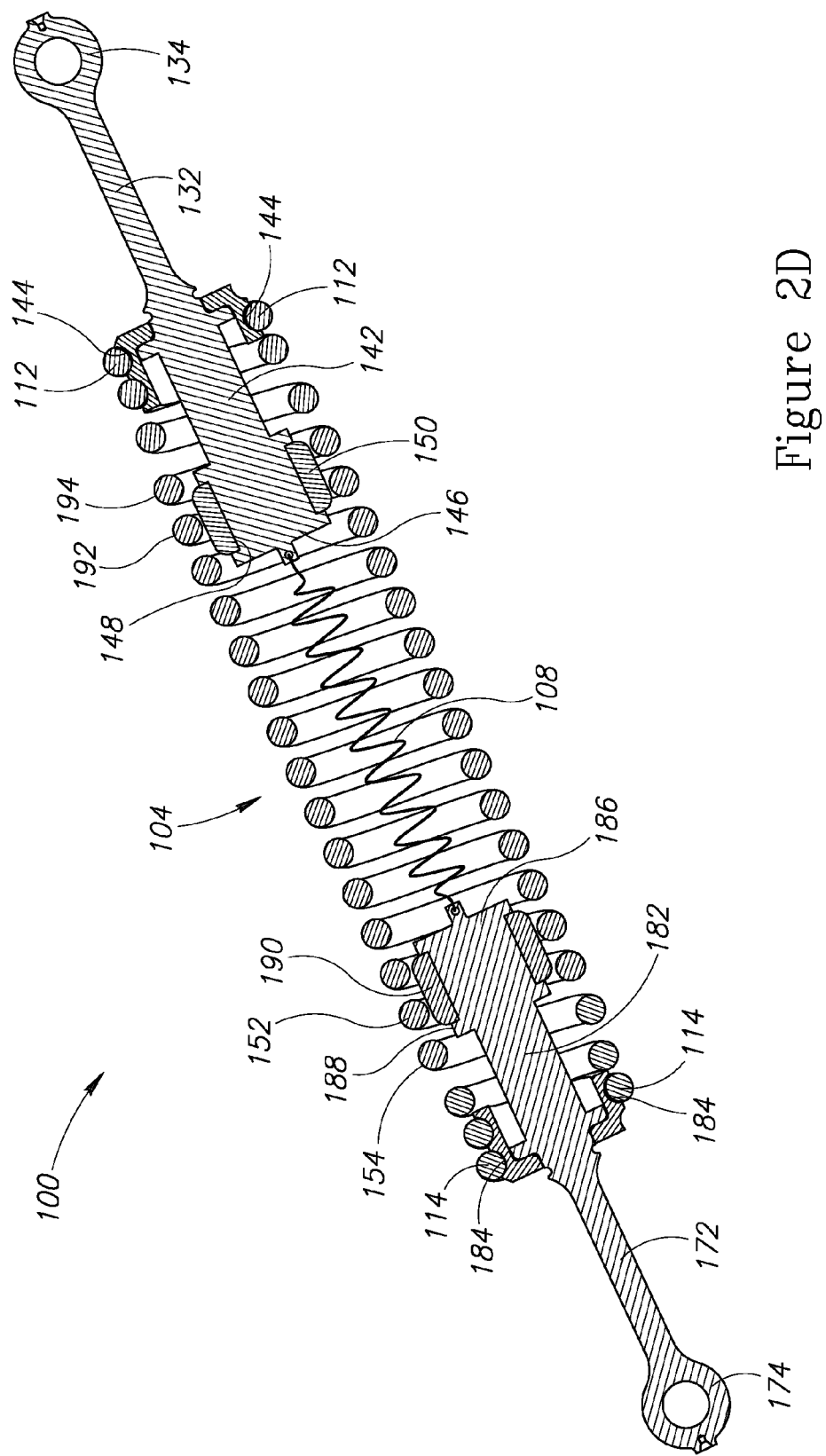
FIG. 2D illustrates another embodiment of a vibration attenuation system wherein damping members do not contact a spring when the spring is in a relaxed state.

FIG. 2C illustrates another embodiment of a vibration attenuation system 100 that includes hollow members. The system is in a tensioned state. First terminal inner shaft 142 and second terminal inner shaft 182 have been hollowed to decrease an overall mass of system 100.

Figure 3A:
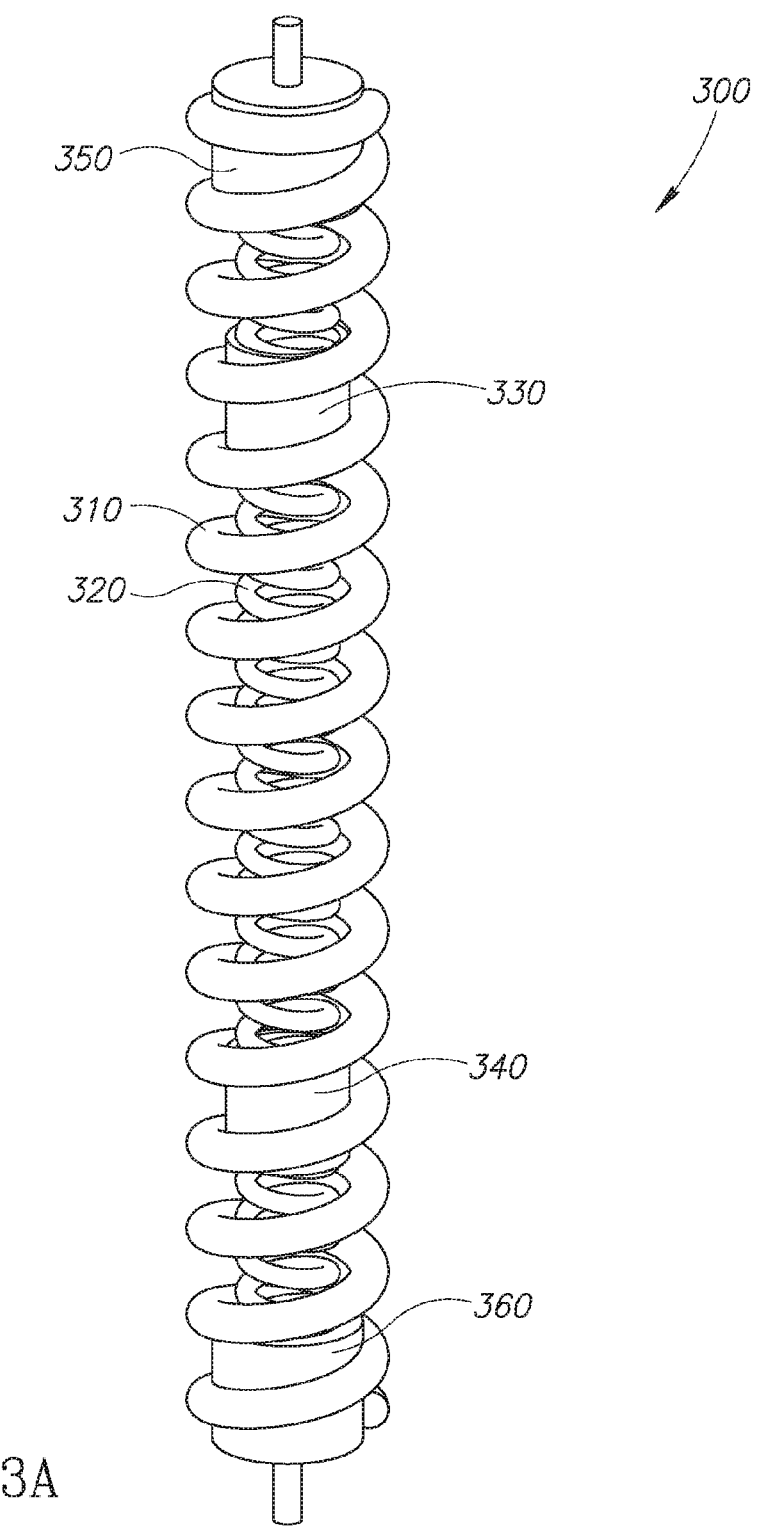
FIG. 3A illustrates another embodiment of a vibration attenuation system that includes two energy-storing elements, two energy-dissipating elements that are each common to each of the energy-storing elements, and a pair of terminals.
Figure 3B:
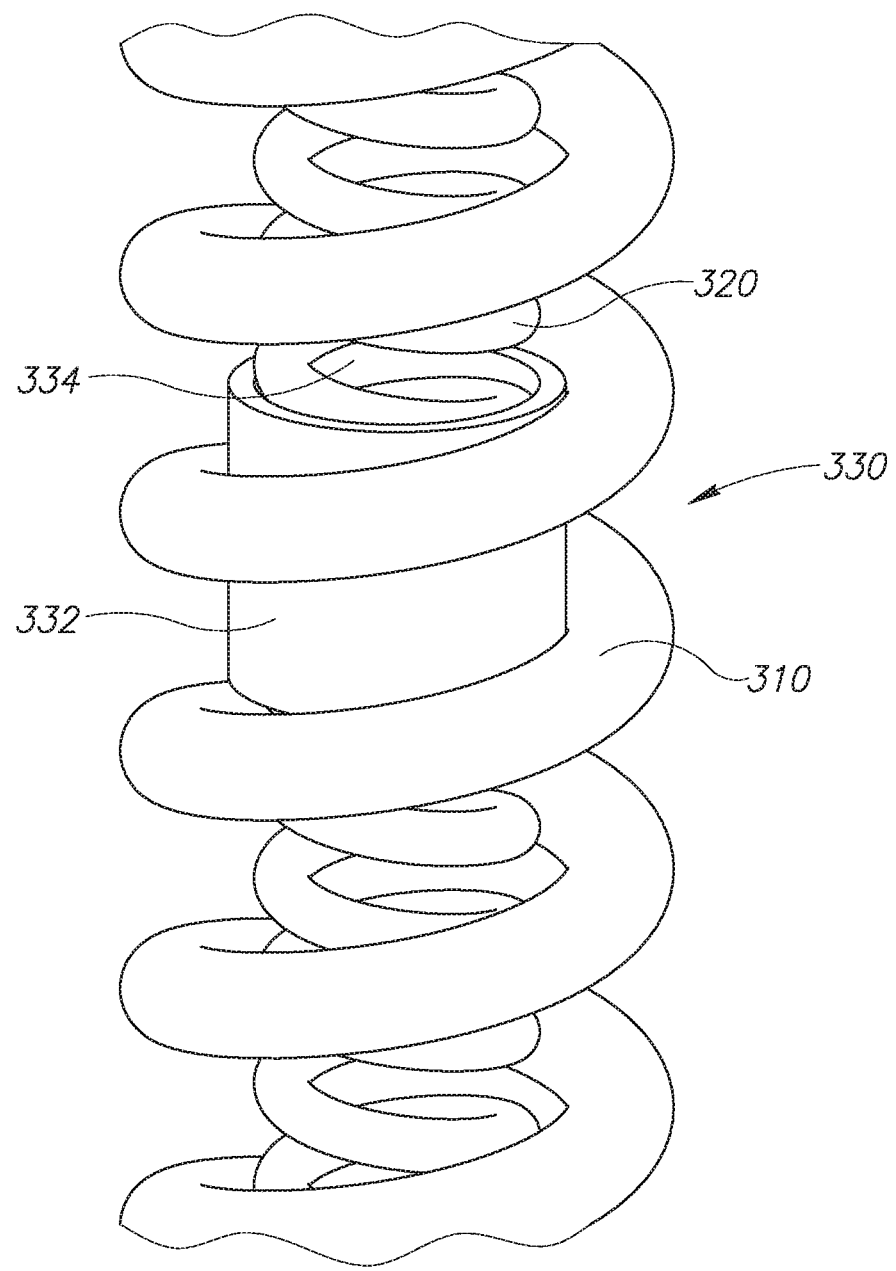
FIG. 3B is a close-up view the vibration attenuation system of FIG. 3A that shows a close-up of one of the common energy-dissipating elements.

FIG. 3A illustrates another embodiment of a vibration attenuation system 300 that includes two energy-storing elements 310/320, two energy-dissipating elements 330/340. Each of the energy-dissipating elements 330/340 are common to each of the energy-storing elements 310/320. System 300 includes a pair of terminals 350/360. FIG. 3B is a close-up view the vibration attenuation system 300 of FIG. 3A that shows a close-up of the first common energy-dissipating element 330 in engagement with both the first energy-storing element 310 and the second energy-storing element 320. The first energy-dissipating element 330 includes an inner surface 334 and an outer surface 332. In various embodiments, at least one of the first and second energy-dissipating elements 330/340 may include similar features to damper element 450 of FIGS. 4A-4C. Accordingly, first energy-dissipating element 330 may be a first annular damper element and second energy-dissipating element 340 may be a second annular damper element 340.

First energy-storing element 310 may be a first spring and second energy-storing elements 320 may be a second spring. First spring 310 is configured parallel to second spring 320, such that the transmission of a force or energy-carrying signal may be distributed between first spring 310 and second spring 320. In preferred embodiments, first spring 310 and second spring 320 are arranged as concentric springs such that the longitudinal axis of first spring 310 is coaxial with the longitudinal axis of second spring 320. First spring 310 is an outer spring and second spring 320 is an inner spring. Although FIGS. 3A-3B illustrate two energy-dissipating elements 330/340, in some embodiments, only a single energy-dissipating element or damper is included. In at least one embodiment, system 300 includes three or more damper elements.

First terminal 350 couples first spring 310 to second spring 320 at the first end of each of the springs 310/320. Likewise, second terminal 360 couples first spring 310 to second spring 320 at the second end of each of the springs 310/320. The inner surfaces of the terminal 350/360 may include helical groves to rotatably receive the first end coils of inner spring 320. The outer surfaces of the terminal 350/360 may include helical groves to rotatably receive the first end coils of inner spring 320.

First spring 310 may include a first spring constant that characterizes the proportionality between the first spring's 310 restoring force and the displacement of the first spring 310. Similarly, second spring 320 may include a second spring constant that characterizes the proportionality between the second spring's 320 restoring force and the displacement of the second spring 310. In preferred embodiments, the first and second spring constants are dissimilar. In other embodiments, the first and second spring constants are substantially equivalent.

The first and second dampers 330/340 are sandwiched between the concentrically arranged inner spring 320 and outer spring 310. As such, both a first receiving aperture of the first damper 330 and a second receiving aperture of the second damper 340 receive the inner spring 320. When in position, at least one helical coil of the outer first spring 310 engages an outer surface of at least one of dampers 330/340 along a helical arc subtending an angle of at least 90°. In some embodiments, the angle subtending the helical arc is at least 180°. In at least one embodiment, the angle subtending the helical arc is at least 360°. In preferred embodiments, a plurality of coils of the first spring 310 engages with the outer surface of first damper element 330 and another plurality of coils of the first spring 310 engages with the outer surface of second damper element 340.

When in position, at least one helical coil of the inner second spring 320 engages an inner surface of the receiving aperture of at least one of dampers 330/340 along a helical arc subtending an angle of at least 90°. In some embodiments, the angle subtending the helical arc is at least 180°. In at least one embodiment, the angle subtending the helical arc is at least 360°. In some embodiments, a plurality of coils of the second spring 320 engages with the inner surface of first damper element 330 and another plurality of coils of the second spring 312 engages with the inner surface of second damper element 340.

As noted throughout, the engagement between the coils and the damper elements may be a frictional engagement, a compressive engagement, or a combination thereof. The engagement transfers energy from the springs 310/320 to the dampers 330/340. The dampers 330/340 dissipate energy away from system 300, as well as dampen the transmission of a signal over springs 310/320. The dampers 330/340 also attenuate oscillatory motion of the system 300. In preferred embodiments, the dampers 330/340 simultaneously engage both the outer spring 310 and the inner spring 320.

In at least one embodiment, the inner spring 320 compressively engages with the inner surface of each of the dampers 330/340 when the inner spring 320 is under compression. The outer spring 310 compressively engages with the outer surface of each of the dampers 330/340 when the outer spring 310 is under tension. The oscillatory motion of the outer and inner springs 310/320 may be at substantially similar or dissimilar frequencies. In addition, the oscillatory motion of the outer and inner springs 310/320 may relatively be in-phase or out-of-phase.

In some embodiments, the dampers 330/340 are positioned along the coaxial longitudinal axes of the outer and inner springs 310/320 to be adjacent to regions of the springs 310/320 that are prone to breaking. In preferred embodiments, the dampers 330/340 efficiently damp oscillatory motion over frequency windows that include the resonance frequencies of both the first spring 310 and the second spring 320. The presences of the dampers 330/340 decreases the likelihood of damage to the springs 310/320.

Figure 5:
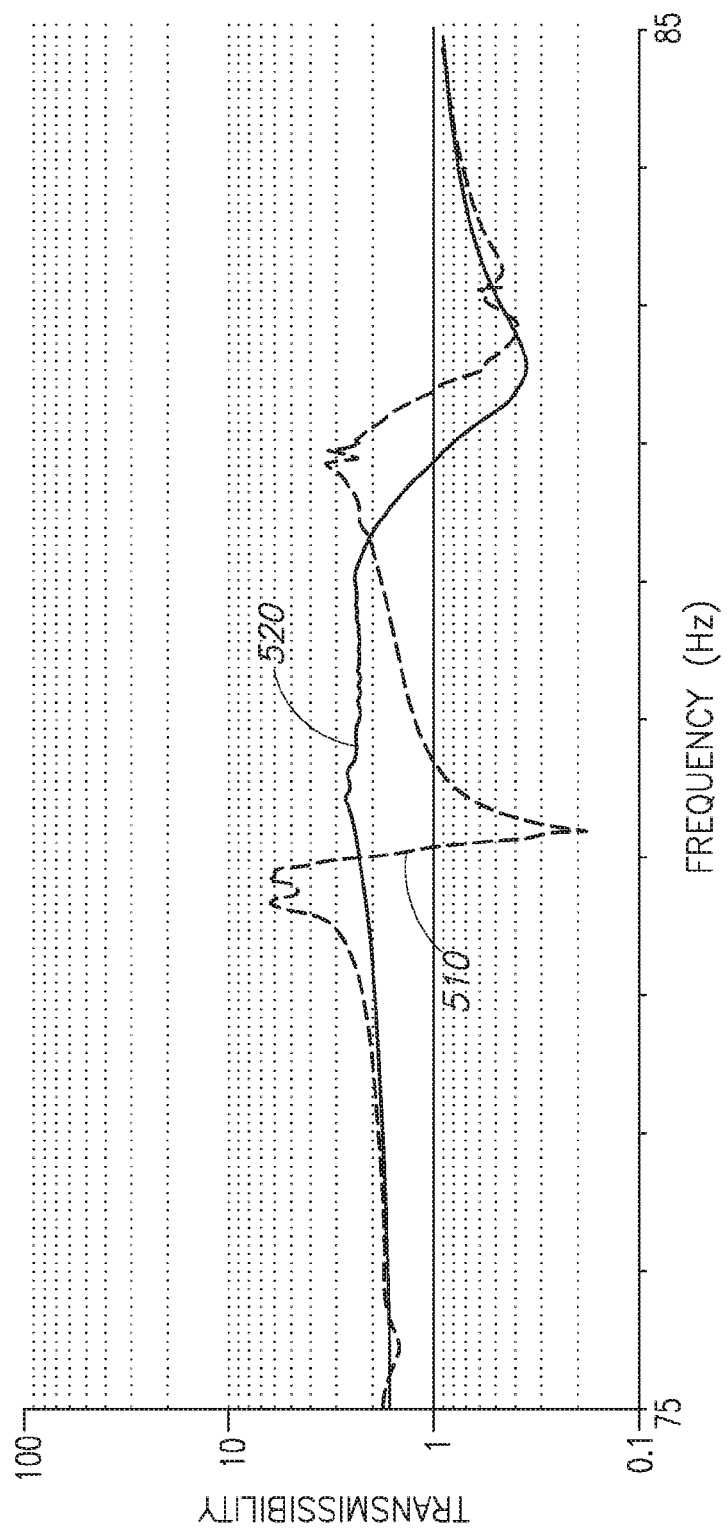
FIG. 5 shows plots of the un-attenuated and the attenuated transmission of an input signal, where the attenuation of the transmitted signal is enabled by various embodiments disclosed herein.

FIG. 5 shows plots of the un-attenuated and the attenuated transmission of an input signal, where the attenuated transmission is enabled by the various embodiments disclosed herein. Curve 510 shows a representative un-attenuated transmissibility of an input signal that varies in frequency, between approximately 75 Hz to 85 Hz, across a spring system without damping elements included in the system. A resonance transmission of the signal occurs between 73 Hz and 74 Hz. Curve 520 shows a representative attenuated transmissibility of an input signal that varies in frequency across an attenuation system consistent with the embodiments disclosed herein. The resonance transmission between 73 Hz and 74 Hz is damped and/or attenuated. Note the logarithmic scale for the transmissibility indicated by the y-axis. Attenuating the transmission of the signal, and specifically damping the transmissions around the resonance frequencies prevents damage and catastrophic faille of the spring systems disclosed herein.

While the preferred embodiments of the invention have been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A vibration attenuation system for attenuating a transmission of an input signal, the system comprising:
   a helical spring that includes a plurality of helical coils defining a longitudinal axis, a first end, and a second end, wherein the plurality of helical coils define an inner volume of the helical spring intermediate the first and second ends;
   a first terminal that includes a first inner member, wherein the first terminal is coupled to the first end of the helical spring and the first inner member extends into the inner volume of the helical spring; and
   a first damping element fastened to the first inner member such that the first damping element is within the inner volume of the helical spring and when the input signal is provided to the helical spring, the first damping element engages the helical spring such that the first damping element is permitted to translate along the longitudinal axis relative to the helical spring in response to at least one of compression and extension of the helical spring between the first end and the second end, the first damping element being permitted to translate relative to the helical spring along the longitudinal axis subject to frictional resistance between the helical spring and the first damping element such that the first damping element attenuates the transmission of at least a portion of the input signal;
   wherein the helical spring includes a plurality of first helical coils and a plurality of second helical coils; and
   wherein the first damping element is positioned between the plurality of first helical coils and the plurality of second helical coils when the helical spring is in a relaxed state;
   wherein the first inner member includes a shaft, the first damping element being coupled to the first terminal member by the shaft, the shaft being smaller than an inner diameter of the helical spring such that the plurality of first helical coils does not engage the shaft, the shaft configured to maintain the first damping element in a fixed position relative to the first terminal such that the helical spring slides relative to the first damping element during deformation of the first helical spring.

2. The system of claim 1, wherein the damping element is a toroidal damping element that is topologically equivalent to a torus and the toroidal damping element is positioned on the first inner member such that a hole in the toroidal damping element receives the first inner member.

3. The system of claim 1, wherein the inner member includes a recessed portion and the first damping element is positioned on the recessed portion of the first inner member.

4. The system of claim 1, wherein the shaft is a hollow shaft.

5. The system of claim 1, wherein the first terminal includes a helical groove such that the helical groove engages with at least a helical coil adjacent to the first end of the helical spring to couple the first terminal to the spring.

6. The system of claim 1, wherein the first terminal includes a portion that is external to the inner volume of the helical spring and the external portion includes a mounting aperture.

7. The system of claim 1, wherein when the helical spring is in a first state, such that the helical spring is storing a first amount of energy, the first damping element does not engage with the plurality of helical coils.

8. The system of claim 7, wherein when the helical spring is in a second state, such that the helical spring is storing a second amount of energy and the second amount of energy is greater than the first amount of energy, the first damping element engages with the plurality of helical coils.

9. The system of claim 1, wherein the engagement between the first damping element and the at least one of the plurality of helical coils includes at least a frictional engagement between the first damping element and the at least one of the plurality of coils.

10. The system of claim 1, wherein the engagement between the first damping element and the at least one of the plurality of helical coils includes a compressive force on the first damping element.

11. The system of claim 1, wherein the plurality of coils includes a first helical coil and a second helical coil such that a distance between the first coil and the first end is greater than a distance between the second coil and the first end and when the input signal is provided to the helical spring, a magnitude of a first engagement force that is between the first damping element and the first coil is less than a magnitude of a second engagement force that is between the first damping element and the second coil.

12. The system of claim 11, wherein the first coil includes a first radius, the second coil includes a second radius, and the first radius is greater than the second radius.

13. The system of claim 11, wherein when the input signal is provided to the helical spring, the first damping element does not engage with the first coil such that the magnitude of the first engagement force is substantially zero.

14. The system of claim 1, further comprising:
   a second terminal that includes a second inner member, wherein the second terminal is coupled to the second end of the helical spring and the second inner member extends into the inner volume of the helical spring; and
   a second damping element positioned on the second inner member such that the second damping element is within the inner volume of the helical spring and when the input signal is provided to the helical spring, the second damping element engages another of the plurality of helical coils and further attenuates the transmission of at least a portion of the input signal.

15. The system of claim 14, further comprising a safety leash, wherein a first end of the safety leash is coupled to the first inner member and a second end of the safety leash is coupled to the second inner member.

16. A spring and damper system for damping vibrational energy, the system comprising:
   a first spring that includes at least a first helical coil and a first longitudinal axis within a first internal volume of the first spring, first end of the first spring mounted to a first terminal and a second end of the first spring being mounted to a second terminal;
   a second spring that includes at least a second helical coil and a second longitudinal axis, wherein the first longitudinal axis and the second longitudinal axis are substantially aligned and the second coil is disposed within the first internal volume of the first spring, a first end of the second spring being mounted to the first terminal and a second end of the second spring being mounted to the second terminal; and a first damper element that includes an outer surface, a receiving aperture, and an inner surface of the aperture, wherein the aperture receives at least the second coil of the second spring such the second coil is adjacent to the inner surface and the first coil of the first spring is disposed adjacent to the outer surface, and the first coil of the first spring is configured and arranged to engage with the outer surface of the first damper element along a first helical arc subtending an angle of at least 90° and the second coil of the second spring is configured and arranged to engage with the inner surface of the first damper element along a second helical arc subtending an angle of at least 90°;

wherein the second helical coil includes second spring first coils and second spring second coils, the first damper element being positioned between the second spring first coils and the second spring second coils, such that the second spring first coils are positioned between the first damper element and the first terminal and such that the second spring first coils do not engage any damping element when the first spring is in a relaxed state.

17. The system of claim 16, wherein the first spring includes a third helical coil and the second spring includes a fourth helical coil that is disposed within the first internal volume of the first spring and the assembly further comprising:

a second damper element that includes a second outer surface, a second receiving aperture, and a second inner surface of the second aperture, wherein the second aperture receives at least the fourth coil of the second spring such the fourth coil is adjacent to the second inner surface and the third coil of the first spring is disposed adjacent to the second outer surface, and the third coil of the first spring is configured and arranged to engage with the second outer surface of the second damper element along a third helical arc subtending an angle of at least 90° and the fourth coil of the second spring is configured and arranged to engage with the second inner surface of the second damper element along a fourth helical arc subtending an angle of at least 90°.

18. The system of claim 16 further comprising a first terminal that couples a first end of the first spring to a second end of the second spring.

19. The system of claim 18, wherein the first terminal includes a first helical groove on an outer surface that engages with at least one helical coil of the first spring and a second helical groove on an inner surface that engages with at least one helical coil of the second spring.

20. The system of claim 16, wherein the first spring includes a first resonant frequency and the second spring includes a second resonant frequency and the first resonant frequency and the second resonant frequency are dissimilar resonant frequencies.

21. The system of claim 16, wherein the first spring includes a first spring constant and the second spring includes a second spring constant and the first spring constant and the second spring constant are dissimilar spring constants.

22. The system of claim 16, wherein at least one of a frictional engagement between the first spring and the first damper element or a frictional engagement between the second spring and the first damper element stabilizes a longitudinal positioning of the first damper element.

23. A vibration attenuation system for attenuating a transmission of an input signal, the system comprising:

a helical spring that includes a plurality of helical coils defining a longitudinal axis, a first end, and a second end, wherein the plurality of helical coils define an inner volume of the helical spring intermediate the first and second ends;

a first terminal that includes a first inner member, wherein the first terminal is coupled to the first end of the helical spring and the first inner member extends into the inner volume of the helical spring; and a first damping element fastened to the first inner member such that the first damping element is within the inner volume of the helical spring and when the input signal is provided to the helical spring, the first damping element engages the helical spring such that the first damping element is permitted to translate along the longitudinal axis relative to the helical spring in response to at least one of compression and extension of the helical spring between the first end and the second end, the first damping element being permitted to translate relative to the helical spring along the longitudinal axis and imposing frictional resistance on the helical spring such that the first damping element attenuates the transmission of at least a portion of the input signal;

wherein the helical spring includes a plurality of first helical coils and a plurality of second helical coils; and wherein the first damping element is positioned between the plurality of first helical coils and the plurality of second helical coils when the helical spring is in a relaxed state;

wherein the first inner member includes a shaft, the first damping element being coupled to the first terminal member by the shaft, the shaft being smaller than an inner diameter of the helical spring such that the plurality of first helical coils do not engage the shaft, the shaft configured to maintain the first damping element in a fixed position relative to the first terminal such that the helical spring slides relative to the first damping element during deformation of the first helical spring.

* * * * *